United States Patent
Kurihara et al.

(10) Patent No.: US 8,118,970 B2
(45) Date of Patent: Feb. 21, 2012

(54) SOFT MAGNETIC METAL STRIP LAMINATE AND PROCESS FOR PRODUCTION THEREOF

(75) Inventors: Koichiro Kurihara, Tottori (JP); Yoshitsugu Furui, Tottori (JP)

(73) Assignee: Hitachi Metals, Ltd., Tokyo (JP)

(*) Notice: Subject to any disclaimer, the term of this patent is extended or adjusted under 35 U.S.C. 154(b) by 665 days.

(21) Appl. No.: 12/296,185

(22) PCT Filed: Apr. 5, 2007

(86) PCT No.: PCT/JP2007/057658
§ 371 (c)(1),
(2), (4) Date: Oct. 6, 2008

(87) PCT Pub. No.: WO2007/116937
PCT Pub. Date: Oct. 18, 2007

(65) Prior Publication Data
US 2009/0181259 A1    Jul. 16, 2009

(30) Foreign Application Priority Data
Apr. 7, 2006  (JP) ............................... 2006-106047

(51) Int. Cl.
*B32B 15/088* (2006.01)
(52) U.S. Cl. ...................... 156/331.1; 29/458
(58) Field of Classification Search ............ 156/330.9, 156/331.1; 29/428, 458
See application file for complete search history.

(56) References Cited

U.S. PATENT DOCUMENTS

| | | | | |
|---|---|---|---|---|
| 3,486,934 A | * | 12/1969 | Bond | 428/458 |
| 3,652,355 A | * | 3/1972 | Herrick | 156/151 |
| 4,065,345 A | * | 12/1977 | Progar et al. | 156/307.5 |
| 4,675,246 A | * | 6/1987 | Kundinger et al. | 428/336 |
| 2006/0068210 A1 | * | 3/2006 | Kanakarajan | 428/473.5 |

FOREIGN PATENT DOCUMENTS

| | | |
|---|---|---|
| JP | 58-175654 | 10/1983 |
| JP | 2002-164224 | 6/2002 |
| JP | 2004-090390 | 3/2004 |
| JP | 2004-095823 | * 3/2004 |

* cited by examiner

*Primary Examiner* — Katarzyna Wyrozebski Lee
*Assistant Examiner* — Scott W Dodds
(74) *Attorney, Agent, or Firm* — Brundidge & Stanger, P.C.

(57) ABSTRACT

A soft magnetic metal strip laminate that has high adhesion strength between metal strips, free from delamination, an excellent magnetic property, a high space factor, and a process for production thereof. A process for production of a soft magnetic metal strip laminate that includes plural soft magnetic metal strips laminated by using a polyamide acid solution includes the steps of applying the polyamide acid solution on the soft magnetic metal strip, performing semicuring heat treatment to obtain the degree of imidization of the polyamide acid solution which is in the range of 15 to 70%, laminating plural soft magnetic metal strips to each other through the polyamide acid solution, and performing the heat treatment of the heating and the hot pressing to obtain the degree of imidization of the polyamide acid solution which is more than 90%.

6 Claims, 1 Drawing Sheet

SOFT MAGNETIC METAL STRIP LAMINATE AND PROCESS FOR PRODUCTION THEREOF

FIELD OF THE INVENTION

The present invention relates to a soft magnetic metal strip laminate in which soft magnetic metal strips are attached to each other by using a polyamic acid solution as an adhesive and plural soft magnetic metal strips are laminated, and process for production thereof.

BACKGROUND OF THE INVENTION

An amorphous metal strip has a characteristic of low loss compared to a silicon steel plate, and is used for a transmission and distribution transformers or an iron core of a dynamo-electric machine as a material of a soft magnetic. The amorphous metal strip may be obtained by rapidly cooling a metal melted body on a cooling role that is rotated at a high rate, and has a principle limit in which the thickness of the plate is in the range of 10 to 50 µm. In addition, since the amorphous metal strip is largely distorted during the rapid cooling, if the annealing heat treatment is not performed at 300 to 600° C. the soft magnetic characteristic cannot be sufficiently obtained. In addition, the amorphous metal strip is embrittled by the heat treatment. In order to obtain the required strength for a structure, before the amorphous metal strip was subjected to heat treatment, the amorphous metal strip was processed to have a desirable shape, and was impregnated and hardened an epoxy resin and the like after the heat treatment.

To overcome this problem, Japanese Unexamined Patent Application Publication No. Sho58 (1983)-175654 discloses that a polyimide resin or a polyamideimide resin having excellent heat resistance is applied on an amorphous metal strip, dried, pressed, and subjected to annealing heat treatment. In detail, the resin having heat resistance is applied on both sides of the amorphous metal strip for laminating, a solvent is dried at a temperature of 200° C. or more for 1 min, the amorphous metal strips are pressed and attached to each other by using a pressing roll, the strips are heated in the oven under nitrogen atmosphere, and finally the laminated strips are wound and recovered.

In addition, Japanese Unexamined Patent Application Publication No. 2002-164224 discloses that the resin having heat resistance is applied on the surface of the amorphous metal strip, and thermally pressed by a heat press to form a laminate. In other words, the amorphous metal strip laminate having the weatherproofing characteristics may be obtained by laminating the amorphous metal strips on which the resin having high heat resistance is applied and heating and attaching the amorphous metal strips.

In addition, Japanese Unexamined Patent Application Publication No. 2004-90390 or Japanese Unexamined Patent Application Publication No. 2004-95823 discloses that a polyamide acid solution is applied on an amorphous metal strip, preliminarily dried at 130° C., the degree of imidization of the polyamide acid solution is increased at a temperature of 250° C. or more, amorphous metal strips are laminated, and the strips are pressed at a temperature of 250° C. or more while pressure is applied in a laminating direction. It discloses that the amorphous metal strip laminate produced by using the above process may be used as desirable products without an inflated surface.

PROBLEM TO BE SOLVED BY THE INVENTION

For a soft magnetic metal strip laminate, it is required a sufficient soft magnetic property and no embrittlement by the heat treatment. The invention of Japanese Unexamined Patent Application Publication No. Sho58 (1983)-175654 discloses a production method which includes laminating and attaching soft magnetic strips by using a thermal press roll and heat treating the soft magnetic strips. In the invention of Japanese Unexamined Patent Application Publication No. 2002-164224, by using a resin that has heat resistance, loses a weight by 5% from the room temperature to the temperature of 300° C. or more in the atmosphere, the strength of the laminate is ensured at high temperatures.

In addition, as a soft magnetic metal strip laminate, a structure, on which a polyimide resin having excellent heat resistance is particularly applied, is required to have high performance and reliability.

However, the inventions of the Japanese Unexamined Patent Application Publication No. Sho58 (1983)-175654 and Japanese Unexamined Patent Application Publication No. 2002-164224 do not disclose a detailed description regarding the above. In addition, as described in the Japanese Unexamined Patent Application Publication No. 2004-90390 and Japanese Unexamined Patent Application Publication No. 2004-95823, even though a soft magnetic metal strip that is coated with a resin that has a high degree of imidization by the heat treatment, that is, a polyimidized resin, is laminated and pressed, there is a limit in space factor (=(average thickness of the soft magnetic metal strip×the number of laminated laminates)/(thickness of the laminate)), and the soft magnetic metal strip laminate fully satisfying the above requirements has not been obtained. In addition, in the related art, defects on the surface of the laminate are evaluated, but voids on the inside of the laminate are not disclosed.

The present inventors observed the inside of the soft magnetic metal strip laminate by using an ultrasonic flaw detection, and found that internal delamination is caused by the inside void and countermeasures need to be examined.

Accordingly, the present invention has been made keeping in mind the problems occurring in the related art, and it is an object of the present invention to provide a process for production of a soft magnetic metal strip laminate that has the high adhesion strength between the metal strips and free from delamination, the excellent magnetic properties, and the high space factor, and a soft magnetic metal strip laminate that is produced by using the method.

MEANS FOR SOLVING PROBLEM

Hereinafter, the present inventors have researched in order to achieve the above object, and found that when a polyamide acid solution that is applied on a soft magnetic metal strip has a small degree of imidization before it is pressed, the space factor of the soft magnetic metal strip laminate that is finally obtained is improved.

That is, the present invention provides a process for production of a soft magnetic metal strip laminate that includes plural soft magnetic metal strips laminated by using a polyamide acid solution, which includes the steps of applying the polyamide acid solution on the soft magnetic metal strip; performing a first heat treatment for drying the soft magnetic metal strip (semidrying heat treatment) to obtain a degree of imidization of the polyamide acid solution, which is in the range of 15 to 70%; laminating plural soft magnetic metal strips through the polyamide acid solution; and performing a second heat treatment for heating the laminated soft magnetic metal strips to obtain a degree of imidization of the polyamide acid solution, which is more than 90%.

In addition, the "degree of imidization" of the polyamide acid solution while the first heat treatment is performed is a value immediately before a press process is performed after drying. If the degree of imidization by a semidrying heat treatment is less than 15%, when they are pressed, the amount of steam (gas) that is formed by the polycondensation reaction is large, a delamination portion is formed between the layers due to the gas pressure or an unattached portion is easily formed due to a gas discharging route. In addition, if the degree of imidization is more than 70%, when the strips are attached to each other by the heat treatment, the polycondensation reaction of the polyimide resin becomes insufficient to make the attachment strength insufficient. The preferable range of the degree of imidization by the semidrying heat treatment is 20% to 60%. More preferably, the range is 25% to 50%.

It is preferable that the second heat treatment that is performed after the semicuring heat treatment, that is, the pressing heat treatment, is performed while the soft magnetic metal strips are pressed each other. It is preferable that the second heat treatment is performed under nitrogen atmosphere, the amount of nitrogen is 98 vol % or more, and a dew point is −30° C. or less. In addition, it is preferable that the second heat treatment is performed at a temperature that is more than a glass transition temperature of the polyimide resin.

In the soft magnetic metal strip laminate of the present invention which is obtained by the above production method, a space factor is 95% or more in a laminating direction. Here, the space factor in a laminating direction is obtained by dividing a value that is obtained by multiplying the average thickness of the soft magnetic metal strip by the number of laminates by the thickness of the laminate in the laminating direction and multiplying the resulting value by 100.

[Soft Magnetic Metal Strip]

It is preferable that the soft magnetic metal strip that is used in the present invention is an iron-based or a Co-based amorphous metal strip. Generally, the thickness of the amorphous metal strip is in the range of 10 to 50 μm, and the most suitable thickness is selected according to the purpose of the desired cost, the frequency of the used magnetic products or the like. For example, if the thickness is reduced, since the loss of eddy current is reduced, it is preferable that the thickness is 20 μm or less in order to reduce high frequency loss. Meanwhile, in order to reduce the size, it is preferable that the space factor of the iron core is increased and the thickness is increased. In addition, since the number of production processes is in proportion to the number of laminates, it is preferable that the thickness is increased in order to obtain the low cost.

In the used soft magnetic alloy strip, the alloy composition is represented by $T_aSi_bB_cC_d$ (T is an element that includes at least one of Fe, Co, and Ni, and a+b+c+d=100%), and it is preferable that the soft magnetic alloy strip is an amorphous alloy that includes 79≦a≦83%, 0<b≦10%, 10≦c≦18%, 0.01≦d≦3% and an inevitable impurity on the basis of atomic %. The reason for limiting the composition will be described below. The thickness of the used soft magnetic alloy strip is in the range of 10 to 50 μm, and since the soft magnetic alloy strip is very thin and the occurrence of eddy current may be suppressed even if the strips are laminated as a structure of an iron core, the strips may be used as the laminate that has very low eddy current loss.

The reason for limiting the composition of the soft magnetic alloy strip is as follows. Hereinafter, % means atomic %.

If the amount "a" of T (Fe, Co and the like) is lower than 79%, the saturated magnetic flux density $B_s$ may not be sufficiently obtained as a material of an iron core, and the magnetic core becomes enlarged, which is not preferable. In order to obtain the sufficient saturated magnetic flux density $B_s$, it is more preferable that the amount of T is 81% or more. In addition, if the amount is 83% or more, thermal stability is reduced, and the stable amorphous alloy strip may not be produced. In the purpose of a rotor of a rotation device or a stator, it is preferable to use a Fe-based soft magnetic alloy strip in consideration of cost, but according to the required magnetic property, a 10% or less portion of the amount of Fe may be substituted with at least one of Co and Ni.

The amount "b" of Si needs to be 10% or less in order to improve $B_s$ as an element that contributes to the amorphous forming ability. In addition, it is preferable that the amount is 5% or less in order to improve $B_s$.

The amount "c" of B most largely contributes to the amorphous forming ability. If the amount is less than 10%, the thermal stability is reduced, and if the amount is more than 18%, the amorphous forming ability is not improved even though B is added more.

"C" improves the angle formation of the material and $B_s$ to minimize the magnetic core and to reduce the noise. If the amount "d" of C is less than 0.01%, the effect is insignificant, and if the amount is more than 3%, the embrittlement and the thermal stability are reduced and it is difficult to produce the magnetic core, which is not preferable.

If a 10% or less portion of the amount of Fe is substituted with one or two of Ni and Co, the saturated magnetic flux density $B_s$ is improved and contributes to the miniaturization of the magnetic core, but since it is costly raw material, it is not included in an amount that is more than 10%.

In addition, a small amount of Mn slightly improves $B_s$. If Mn is added in an amount of 0.50% or more, $B_s$ is reduced, thus it is preferable that the amount is 0.1% to 0.3%.

In addition, one or more elements of Cr, Mo, Zr, Hf, and Nb may be included in an amount of 0.01 to 5%, and as an inevitable impurity thereof, at least one element of S, P, Sn, Cu, Al, and Ti may be included in an amount of 0.50% or less.

[Polyamide Acid Solution]

In the present invention, it is preferable that the polyamide acid solution that is applied on the soft magnetic metal strip is a thermosetting solution, and it is preferable that the N methylpyrrolidone (NMP) solution of the commercial polyamide acid is diluted with NMP to use. For example, the content of the polyamide acid of the commercial polyamide acid solution is about 20% by weight, and the polyamide acid of the commercial polyamide acid solution may be diluted by adding NMP to the concentration in the range of 5 to 15% by weight to use. If the thickness is reduced after the solvent is dried, the space factor is improved, but the generation of defects such as pin poll is increased and the insulation between the adjacent metals in the laminate is poor. Accordingly, it is preferable that the thickness is in the range of 0.5 μm to 3 μm after the drying.

In addition, since the polyamide acid NMP solution has excellent wettability with the metal strip, by coating both sides of the metal strip, sufficient adhesion strength between the resin and the metal may be obtained during the processes after drying. Examples of the coating method includes known methods such as a dipping method, a doctor blade method, a gravure roll method and the like. However, in considering the uniformity of the coating thickness and a forming rate per hour (coating rate), the gravure roll method is excellent. In order to coat both sides thereof by using the gravure roll method, after one side is first coated, other side is coated.

[Coating and Drying]

Next, the first heat treatment (semidrying heat treatment) for semidrying the soft magnetic metal strip that is coated with the polyamide acid NMP solution is performed. The drying of the polyamide acid NMP solution performs imidization even if the drying temperature is too high and the drying time is too long. It is preferable that the maximum temperature is 200° C. or less and the maintaining time is 1 min or less. It is preferable that the amount of wind is high in a drying furnace. The drying method by using the far infrared ray heater is well known, but since the drying by using the far infrared ray is directly performed in respects to the polyamide acid molecule to promote imidization, such that the imidization should not be excessively increased. By the semidrying heat treatment, the degree of imidization of the polyamide acid solution is in the range of 15% to 70%. The degree of imidization in the present invention is obtained when a value that is obtained by measuring the degree of imidization of the polyimide acid solution that is subjected to the heat treatment at a temperature that is more than the glass transition point of the resin for 1 hour by using the FT-IR (infrared analysis) is considered 100%.

[Working Process]

The soft magnetic metal strip is coated with the polyamide acid NMP solution is shaped by, for example, a press working. In addition, a shape having a high degree of freedom and high productivity may be obtained by etching process, a laser beam machining or the like. In addition, without an initial process, after the laminating process as described below is performed, plural strips may be machined or processed at one time.

[Laminating Process]

The soft magnetic metal strips that are machined or processed to have a predetermined shape are put in a mold cavity for laminating and plurally laminated. Since an moving part for applying pressure is contacted with the upper and the lower parts of the laminate, after a hot pressing process of the post-process, a polyimide film, or Teflon (trademark) film such as captone or upirex that is sold on the market may be inserted between the laminate and the moving part so that the moving part is separated from the laminate.

[Heating and hot pressing Process]

Next, in respects to the laminated soft magnetic metal strip, the second heat treatment for heating and hot pressing it is performed, and the laminate is formed. The laminated soft magnetic metal strips are provided in the mold under a dried nitrogen atmosphere in a hot press furnace. The temperature thereof is increased to a temperature that is higher than a glass transition point of the polyimide film which is coated on the furnace. While this temperature is maintained, the soft magnetic metal strips are hot pressed each other. The upper limit of the temperature is not important as long as it is lower than a thermal decomposition initialization temperature of the resin. It is preferable that the maintaining time is 1 min to 10 hours. By the heat treatment, the degree of imidization of the polyamide acid NMP solution is 30% or more.

It is preferable that applied pressure for hot pressing is 1 MPa or more in order to sufficiently provide the polyamide acid NMP solution on the surface of the adjacent resin film or the soft magnetic metal strip. Meanwhile, if the pressure is more than 20 MPa, the polyamide acid NMP solution may be denaturalized and the adjacent soft magnetic metal strips may be contacted each other. However, under the specific condition such as the specific drying atmosphere, the pressure is unnecessary, and when the degree of imidization is increased while they are laminated, the laminate may be formed.

It is preferable that the atmosphere in the furnace includes dried nitrogen atmosphere. If the atmosphere includes 98 vol % or more of nitrogen purity and has a dew point that is −30° C. or less, the moisture that is generated when the resin is subjected to imidization may be rapidly removed and the oxidation of the surface of the metal strip may be prevented. It is more preferable that the nitrogen gas obtained from the liquid nitrogen has a purity of 99.9998% and a dew point of −50° C. or less.

By this process, the degree of imidization of the polyamide acid solution is 90% or more and preferably 93% or more.

[Annealing Heat Treatment Process]

Next, in the third heat treatment, the soft magnetic metal strip laminate is annealed at a temperature that is higher than that of the second heat treatment. The amorphous metal strip may have excellent magnetic properties by the annealing heat treatment. The Fe-based amorphous metal strip is formed at 300 to 400° C., and the Co-based amorphous metal strip is formed at 300 to 600° C. At this time, it is known that the material is embrittled, the hot pressing of the amorphous alloy strip laminate in the annealing heat treatment may cause defects such as voids, cracks or the like in the amorphous alloy strip laminate. Accordingly, it is preferable that the annealing heat treatment is performed under a non-load state. In general, the annealing heat treatment may not be applied to a rotation device core that requires mechanical strength. In addition, since the annealing heat treatment process has a temperature that is higher than that of the hot pressing process of the preceding process, the degree of imidization is increased. At this time, since moisture is generated from the polyamide acid NMP solution, in order to prevent oxidation on the surface of the metal strip, it is preferable that the annealing heat treatment is performed under the same atmosphere as the hot pressing process. It is preferable that the duration of the heat treatment is in the range of 0.1 to 20 h.

The polyamide acid solution that is used in the adhesive according to the present invention is a thermosetting solution, and may be obtained, for example, by reacting aromatic tetracarboxylic acid anhydrides and aromatic diamine with each other.

As the acid anhydride, tetracarboxyl acid anhydrides and a derivative thereof may be used. In detail, as the tetracarboxyl acid, pyrromelitic acid, 3,3',4,4'-biphenyl tetracarboxyl acid, 3,3',4,4'-benzophenone tetracarboxyl acid, 3,3',4,4'-diphenylsulfonetetracarboxyl acid, 3,3',4,4'-diphenylethertetracarboxyl acid, 2,3,3',4'-benzophenone tetracarboxyl acid, 2,3,6,7-naphthalene tetracarboxyl acid, 1,2,5,6-naphthalene tetracarboxyl acid, 3,3',4,4'-diphenylmethanetetracarboxyl acid, 2,2-bis(3,4-dicarboxyphenyl)propane, 2,2-bis(3,4-dicarboxyphenyl)hexafluoropropane, 3,4,9,10-tetracarboxyperrylene, 2,2-bis[4-(3,4-dicarboxyphenoxy)phenyl]propane, 2,2-bis[4-(3,4-dicarboxyphenoxy)phenyl]hexafluoropropane, butanetetracarboxyl acid, cyclopentane tetracarboxyl acid and the like may be used. In addition, esterified substances, acid chlorides, acid anhydrides thereof and the like may be used.

As diamine, diamines such as p-phenylene diamine, m-phenylene diamine, 2'-methoxy-4,4'-diaminobenzanilide, 4,4'-diaminodiphenyl ether, diaminotoluene, 4,4'-diaminodiphenylmethane, 3,3'-dimethyl-4,4'-diaminodiphenylmethane, 3,3'-dimethyl-4,4'-diaminodiphenylmethane, 2,2-bis[4-(4-aminophenoxy)phenyl]propane, 1,2-bis(anilino)ethane, diaminodiphenylsulfone, diaminobenzanilide, diaminobenzoade, diaminodiphenyl sulfide, 2,2-bis(p-aminophenyl)propane, 2,2-bis(p-aminophenyl)hexafluoropropane, 1,5-diaminonaphthalene, diaminotoluene, diaminobenzo trifuloride, 1,4-bis(p-aminophenoxy)benzene, 4,4'-

(p-aminophenoxybiphenyl, diaminoanthraquinone, 4,4'-bis(3-aminophenoxyphenyl)diphenylsulfone, 1,3-bis(anilino)hexafluoropropane, 1,4-bis(anilino)octafluoropropane, 1,5-bis(anilino)decafluoropropane, 1,7-bis(anilino)tetradecafluoropropane, 2,2-bis[4-(p-aminophenoxy)phenyl]hexafluoropropane, 2,2-bis[4-(3-aminophenoxy)phenyl]hexafluoropropane, 2,2-bis[4-(2-aminophenoxy)phenyl]hexafluoropropane, 2,2-bis[4-(4-aminophenoxy)-3,5-dimethylphenyl]hexafluoropropane, 2,2-bis[4-(4-aminophenoxy)-3,5-ditrifluoromethylphenyl]hexafluoropropane, p-bis(4-amino-2-trifluoromethylphenoxy)benzene, 4,4'-bis(4-amino-2-trifluoromethylphenoxy)biphenyl, 4,4'-bis(4-amino-3-trifluoromethylphenoxy)biphenyl, 4,4'-bis(4-amino-2-trifluoromethylphenoxy)diphenylsulfone, 4,4'-bis(4-amino-5-trifluoromethylphenoxy)diphenylsulfone, 2,2-bis[4-(4-amino-3-trifluoromethylphenoxy)phenyl]hexafluoropropane, benzidine, 3,3',5,5'-tetramethylbenzidine, octafluorobenzidine, 3,3'-methoxybenzidine, o-tolidine, m-tolidine, 2,2',5,5',6,6'-hexafluorotolidine, 4,4"-diaminoterphenyl, 4,4'''-diaminoquaterphenyl and the like may be used.

In addition, as a solvent for dilution, N-methylpyrrolidone (NMP), dimethylformamide (DMF), dimethylacetamide (DMAc), dimethyl sulfoxide (DMSO), sulfuric acid dimethyl, sulfolane, butyrolactone, cresol, phenol, phenol halides, cyclohexanone, dioxane, tetrahydrofuran, diglyme and the like may be used. In particular, by using N-methylpyrrolidone (NMP), dimethyl formamide (DMF), dimethylacetamide (DMAc) and a mixture thereof, wettability to the amorphous alloy strip becomes excellent, which is preferable. In addition, if a solvent in addition to the above solvents has a molecular structure that is similar to those of the above solvents, it may have the same wettability as the amorphous alloy strip.

EFFECT OF THE INVENTION

According to the present invention, when plural soft magnetic metal strips that are coated with the polyamide acid solution and dried are laminated and hot pressed, since the degree of imidization of the polyamide acid solution is maintained at the range of 15% to 70% before the hot pressing process starts, in the heat treatment that is sequentially performed after the hot pressing process, by simultaneously performing the hot pressing process and the reaction process using the degree of imidization that is more than 90%, the reaction for imidizing the polyamide acid at high temperatures and pressures, that is, the polyimidization reaction, is uniformly and precisely performed to form a dense polyimide film having small voids.

In addition, if both sides of the soft magnetic metal strip are coated with the polyamide acid solution, polyimide films are contacted to each other when they are laminated, and the imidization reaction is performed while they come close to each other, thus high bonding may be obtained between the laminates. Therefore, the laminate in which the space factor is 95% or more in a laminating direction and adhesion reliability is high for each laminate may be obtained. In addition, since the imidization and the hot pressing processes are simultaneously performed, the drying process that is performed in the related art is unnecessary and a series treatment process may be performed without the cooling to room temperature to produce them.

In addition, since the saturated magnetic flux density is in proportion to the space factor, the space factor is 95% or more in a laminating direction and the excellent magnetic property may be obtained. In particular, since an electro motor requires the high saturated magnetic flux density, it is useful to increase the space factor. In addition, if the adhesion reliability is high, the mechanical strength and the durability are improved.

DETAILED DESCRIPTION OF THE PREFERRED EMBODIMENT

Figure 1:
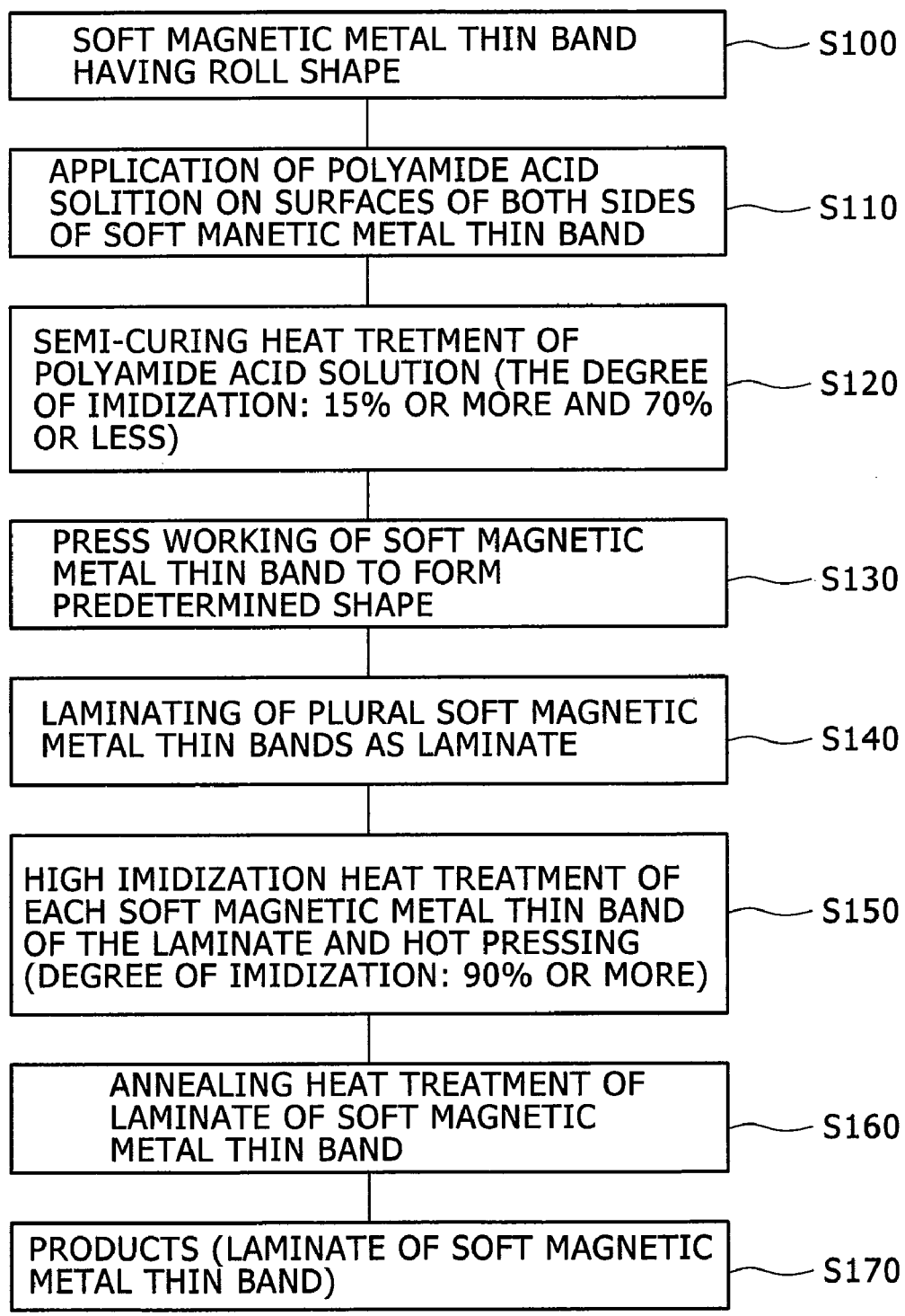
FIG. 1 is a view that illustrates a soft magnetic metal strip laminate and a process for production thereof according to a first embodiment of the present invention.

Hereinafter, Examples of the present invention will be described in detail.

Example 1

With reference to FIG. 1, a soft magnetic metal strip laminate and a process for production thereof according to Example 1 of the present invention will be described in detail.

As the Fe-based amorphous metal strip, the 2605SA1 material that had an average thickness of 25 μm, the width of 50 mm, and the length of 1000 m and was manufactured by Metglas, Co., Ltd. was used. This Fe-based amorphous metal strip was wound around the paper roll having an inner diameter of 3 inches to form a roll shape (S100).

As the polyamide acid solution of the adhesive, 3 liters of U varnish A that was manufactured by Ube Industries, Ltd. and diluted in NMP by two times was prepared. The amount of solid after the dilution was about 9% by weight. The glass transition point of the polyimide film that was shaped from the polyamide acid solution was 285° C. The glass transition point was obtained from the DSC measurement chart by separating the polyimide film after the drying and using DSC-200 (Seiko Instruments & Electronics, Ltd.).

Next, the prepared polyamide acid solution was injected into the discharge tank of the gravure roll coating device. And then the amorphous metal strip having the roll shape was provided on the gravure roll coating device, and the polyamide acid solution was continuously coated while the amorphous metal strip was drawn. The gravure roll that had the mesh of 180 and the depth of 40 μm was used, and the coating rate was 10 m per minute. In addition, the roll is rotated at the same rate as the coating rate in respects to the amorphous metal strip to transfer the polyamide acid solution for coating (S110).

After the polyamide acid solution was coated, the amorphous metal strip was continuously passed through the drying furnace that was connected to the gravure roll coating device, and the polyamide acid solution was semidried. The length of the drying furnace was 3 m, and the internal temperature of the furnace was 180° C. Air in the furnace was partially discharged to the outside and the remaining air is cycled in the furnace. The amorphous metal strip that was coated with the polyamide acid solution was passed through the drying furnace for about 20 sec. It was confirmed that the amorphous metal strip that passed through the drying furnace was dried in respects to a predetermined amount of the coated polyamide acid solution.

Thereby, the amorphous metal strip that had the total length of 1000 m was continuously coated with the polyamide acid solution and dried. The thickness of the polyamide acid solution was measured by using the micrometer after drying, the average coating thickness was 1 μm and a difference in coating thickness was 0.2 μm.

Next, the opposite side of the amorphous metal strip was coated with the polyamide acid solution and dried.

By the above process, the amorphous metal strip that was coated with the polyamide acid solution and then dried is obtained (S120).

The degree of imidization of the polyimide film coated on the amorphous metal strip was calculated. The degree of imidization was calculated that the degree of imidization was assumed 100% in respects to the polyimide film upirex S manufactured by Ube Industries, Ltd. by using the ratio of the C=N expansion and contraction absorbancy of imide of 1367 $cm^{-1}$ to the benzene ring expansion and contraction absorbancy of the infrared absorption spectrum 1500 $cm^{-1}$. As a result, it could be seen that the degree of imidization was in the range of 28 to 35% on both sides. In addition, as described below, it is preferable that the degree of imidization of the polyamide acid solution is 15% to 70%.

The amorphous metal strip that was coated with the polyamide acid solution and dried was subjected to the press working. By using the press mold made of the cemented carbide material, the amorphous metal strip was continuously processed to form a ring having an external diameter of 43 mm and an internal diameter of 25 mm. In addition, by using the upirex polyimide film (upirex manufactured by Ube Industries, Ltd.) having the thickness of 25 μm, plural strips having the same dimension and shape were obtained (S130).

Next, 30 formed amorphous metal strips were laminated in the mold for laminating made of stainless steel. Between the upper and the lower sides of the laminated amorphous metal strips and the moving part, the polyimide film having the same dimension and shape was inserted to prevent fixing of the amorphous metal strips to the mold (S140).

The mold for laminating was set in the hot press furnace, after liquid nitrogen was sufficiently substituted for the nitrogen atmosphere, the temperature of the mold was increased to 300° C., which was higher than the glass transition point of the polyimide film by 15° C., and maintained at that temperature. While the temperature was maintained at 300° C., pressure of 5 MPa was applied in a laminating direction of the amorphous metal strip for 10 min. Next, the internal temperature of the furnace was decreased, and the hot pressed soft magnetic metal strip laminate was taken out from the mold for laminating (S150).

The soft magnetic metal strip laminate was subjected to annealing heat treatment in the furnace under the nitrogen atmosphere using liquid nitrogen at 360° C. for 1.5 hours (S160).

The degree of imidization of the polyimide film after the annealing heat treatment was more than 90%. The height of the laminate after the heat treatment was measured, and the space factor was calculated at 97%.

In addition, the surface of the soft magnetic metal strip laminate was observed by using the stereoscopic microscope at 20× magnitude, but defects such as inflation were not observed. In addition, by using the ultrasonic imaging device that was manufactured by Hitachi Kenki FineTech Co., Ltd., the internal defects were examined with the ultrasonic wave having the frequency of 50 MHz, but defects such as delamination were not observed (S170).

Next, the soft magnetic metal strip laminate was produced by using the same condition as Example 1, except that the semidrying condition was changed to change the degree of imidization. The relation between the degree of imidization of the semidrying heat treatment and the contact area ratio (after the soft magnetic metal strip laminate was delaminated between the laminates after laminating and unification were performed by using the heat treatment, the percentage ratio of the area of the portion to which the polyimide resin was substantially attached to the whole area) is described in Table 1.

TABLE 1

| Degree of imidization | Contact area ratio |
|---|---|
| 11 | 63 |
| 17 | 81 |
| 22 | 90 |
| 31 | 98 |
| 35 | 92 |
| 46 | 87 |
| 66 | 74 |
| 80 | 45 |

From the results of Table 1, it can be seen that the degree of imidization of the polyamide acid solution by the semidrying heat treatment is preferably 15% to 70%. In consideration of the other test results, the preferable range of the degree of imidization by the semidrying heat treatment is 20% to 60%. More preferably, by controlling the degree of imidization in the range of 25% to 50%, the space factor may be high in the laminating direction.

Example 2

As the Fe-based amorphous metal strip, the 2605HB1 material that had the average thickness of 25 μm, the width of 50 mm, and the length of 1000 m and was manufactured by Metglas, Co., Ltd. was used. This Fe-based amorphous metal strip was wound around the paper roll having an inner diameter of 3 inches to form a roll shape. As the polyamide acid solution, 3 liters of U varnish A that was manufactured by Ube Industries, Ltd. and diluted in NMP by two times was prepared. The amount of solid after the dilution was about 9% by weight.

Next, by using the same method as Example 1, both sides of the amorphous metal strip were coated with the polyamide acid solution, and subjected to the semidrying and the press working processes.

Next, 30 formed amorphous metal strips were laminated in the mold for laminating made of stainless steel. Between the upper and the lower sides of the laminated amorphous metal strips and the mole, the polyimide film having the same dimension and shape was inserted to prevent fixing of the amorphous metal strips to the mold.

The mold for laminating was set in the hot press furnace, after the nitrogen atmosphere was sufficiently substituted from the industrial nitrogen bombe so that the dew point was −55° C., the temperature of the mold was increased to 300° C., which was higher than the glass transition point of the polyimide film by 15° C., and maintained at that temperature. While the temperature was maintained at 300° C., the pressure of 3 MPa was applied in a laminating direction of the amorphous metal strip for 10 min. Next, the internal temperature of the furnace was decreased, and the hot pressed soft magnetic metal strip laminate was pulled from the mold for laminating.

The soft magnetic metal strip laminate was subjected to the annealing heat treatment in the furnace under the nitrogen atmosphere using the liquid nitrogen at 330° C. for 1.5 hours. The degree of imidization of the polyimide film after the annealing heat treatment was more than 90%. The height of the laminate after the heat treatment was measured, and the space factor was calculated at 97%.

In addition, the surface of the laminate was observed by using the stereoscopic microscope at 20× magnitude, but defects such as inflation were not observed. In addition, by using the ultrasonic imaging device that was manufactured by Hitachi Kenki FineTech Co., Ltd., the internal defects were examined with the ultrasonic wave having a frequency of 50 MHz, but defects such as delamination were not observed.

Example 3

As the Fe-based amorphous metal strip, the 2605SA1 material that had the average thickness of 25 μm, the width of 50 mm, and the length of 1000 m and was manufactured by Metglas, Co., Ltd. was used. This Fe-based amorphous metal strip was wound around the paper roll having the inner diameter of 3 inches to form a roll shape. As the polyamide acid solution, 3 liters of U varnish A that was manufactured by Ube Industries, Ltd. and diluted in NMP by 1.5 times was prepared. The amount of solid after the dilution was about 12% by weight. The glass transition point of the polyimide film that was shaped from the polyamide acid solution was 355° C. The glass transition point was obtained from the DSC measurement chart by separating the polyimide film after the drying and using DSC-200 (Seiko Instruments & Electronics, Ltd.).

Next, by using the same method as Example 1, both sides of the amorphous metal strip were coated with the polyamide acid solution, and subjected to the semidrying. However, the average coating thickness of the polyamide acid solution after the drying was 1.5 μm. The difference in coating thickness was within 0.2 μm. The degree of imidization of the polyimide film coated on the amorphous metal strip was calculated. The degree of imidization was calculated by using the ratio of the C=N expansion and contraction absorbancy of imide of 1367 $cm^{-1}$ to the benzene ring expansion and contraction absorbancy of the infrared absorption spectrum 1500 $cm^{-1}$. As a result, it could be seen that the degree of imidization was in the range of 20% to 27% on both sides.

Next, the amorphous metal strip was subjected to the press working.

Next, 30 formed amorphous metal strips were laminated in the mold for laminating made of stainless steel. Between the upper and the lower sides of the laminated amorphous metal strips and the mold, the polyimide film having the same dimension and shape was inserted to prevent fixing of the amorphous metal strips to the mold.

The mold for laminating was set in the hot press furnace, after the nitrogen atmosphere was sufficiently substituted from the industrial nitrogen bombe so that the dew point was −55° C., the temperature of the mold was increased to 285° C. and 355° C., which was the same as the glass transition point of the polyimide film, and maintained at that temperature. While the temperature was maintained at 355° C., the pressure of 10 MPa was applied in a laminating direction of the amorphous metal strip for 20 min. Next, the internal temperature of the furnace was decreased, and the hot pressed soft magnetic metal strip laminate was pulled from the mold for laminating.

The soft magnetic metal strip laminate was subjected to the annealing heat treatment in the furnace under the nitrogen atmosphere using the liquid nitrogen at 360° C. for 1.5 hours. The degree of imidization of the polyimide film after the annealing heat treatment was more than 90%. The height of the laminate after the heat treatment was measured, and the space factor was calculated at 96%.

In addition, the surface of the laminate was observed by using a stereoscopic microscope at 20× magnitude, but defects such as inflation were not observed. In addition, by using the ultrasonic imaging device that was manufactured by Hitachi Kenki FineTech Co., Ltd., the internal defects were examined with the ultrasonic wave having the frequency of 50 MHz, but the defects such as delamination were not observed.

Example 4

As the Co-based amorphous metal strip, the 2714A 1 material that had the average thickness of 18 μm, the width of 50 mm, and the length of 1000 m and was manufactured by Metglas, Co., Ltd. was used. This Co-based amorphous metal strip was wound around the paper roll having the inner diameter of 3 inches to form a roll shape. As the polyamide acid solution, 3 liters of Pyer-M. L. RC 5057 that was manufactured by IST Corporation and diluted in NMP by 2 times was prepared. The amount of solid after the dilution was about 7.5% by weight. The glass transition point of the polyimide film that was shaped from the polyamide acid solution was 420° C. The glass transition point was obtained from the DSC measurement chart by separating the polyimide film after drying and using DSC-200 (Seiko Instruments & Electronics, Ltd.).

Next, by using the same method as Example 1, both sides of the amorphous metal strip were coated with the polyamide acid solution, and subjected to the semidrying. The average coating thickness of the polyamide acid solution after the drying was 1 μm. The degree of imidization of the polyimide film coated on the amorphous metal strip was calculated. The degree of imidization was calculated by using the ratio of the C=N expansion and contraction absorbancy of imide of 1367 $cm^{-1}$ to the benzene ring expansion and contraction absorbancy of the infrared absorption spectrum 1500 $cm^{-1}$. As a result, it could be seen that the degree of imidization was in the range of 15% to 24% on both sides.

Next, the amorphous metal strip was subjected to the hot press processing.

Next, 30 formed amorphous metal strips were laminated in the mold for laminating made of stainless steel. Between the upper and the lower sides of the laminated amorphous metal strips and the mold, the polyimide film having the same dimension and shape was inserted to prevent fixing of the amorphous metal strips to the mold.

The mold for laminating was set in the hot press furnace, after the nitrogen atmosphere was sufficiently substituted from the industrial nitrogen bombe so that the dew point was −55° C., the temperature of the mold was increased to 450° C., which was higher than the glass transition point of the polyimide film by 30° C., and maintained at that temperature. While the temperature was maintained at 450° C., the pressure of 15 MPa was applied in a laminating direction of the amorphous metal strip for 10 min. Next, the internal temperature of the furnace was decreased, and the hot pressed soft magnetic metal strip laminate was pulled from the mold for laminating.

The soft magnetic metal strip laminate was subjected to annealing heat treatment in the furnace under nitrogen atmosphere using the liquid nitrogen at 500° C. for 1 hour. The degree of imidization of the polyimide film after the annealing heat treatment was more than 90%. The height of the laminate after the heat treatment was measured, and the space factor was calculated 95%.

In addition, the surface of the laminate was observed by using a stereoscopic microscope at 20× magnitude, but defects such as inflation were not observed. In addition, by using the ultrasonic imaging device that was manufactured by Hitachi Kenki FineTech Co., Ltd., the internal defects were examined with the ultrasonic wave having the frequency of 50 MHz, but defects such as delamination were not observed.

Comparative Example

By using the same method as Example 1, both sides of the amorphous metal strip were coated with the polyamide acid solution, the amorphous metal strip was dried, and subjected to the press working.

Next, like the known production method, the imidization treatment was performed in the drying furnace under the liquid nitrogen atmosphere at the maintaining temperature of 300° C. for the heat treatment time of 30 min.

The degree of imidization of the polyimide film that was subjected to the heat treatment of the imidization was calculated. The degree of imidization was calculated by using the ratio of the C=N expansion and contraction absorbancy of imide of 1367 $cm^{-1}$ to the benzene ring expansion and contraction absorbancy of the infrared absorption spectrum 1500 $cm^{-1}$. As a result, it could be seen that the degree of imidization of the polyamide acid solution before the hot pressing start was about 80% on both sides.

Next, by using the same method as Example 1, plural amorphous metal strips are laminated and hot pressed in the mold, and then subjected to the annealing heat treatment. The height of the laminate after the heat treatment was measured, and the space factor was calculated 93%, which was lower than that of the production method of the present invention.

In addition, by using the ultrasonic imaging device that was manufactured by Hitachi Kenki FineTech Co., Ltd., the internal defects were examined with the ultrasonic wave having the frequency of 50 MHz, and a portion that caused internal delamination was observed. An area of the portion that did not cause delamination was 50% or less of the total area. From the Comparative Example, it can be seen that in order to obtain a soft magnetic metal strip laminate in which the adhesion strength between the metal strips was high and a delamination layer was not formed, the degree of imidization of the polyamide acid solution by the semidrying heat treatment was preferably less than 80%.

What is claimed is:

1. A process for production of a soft magnetic metal strip laminate that includes a plurality of soft magnetic metal strips laminated by using a polyamide acid solution, wherein the alloy composition of the soft magnetic metal strips is represented by $T_a Si_b B_c C_d$ (T is an element that includes at least one of Fe, Co, and Ni, and a+b+c+d=100%), and it is preferable that the soft magnetic metal strip is an amorphous alloy that includes $79 \leq a \leq 83\%$, $0 < b \leq 10\%$, $10 \leq c \leq 18\%$, $0.01 \leq d \leq 3\%$ and an inevitable impurity on the basis of atomic %, the process comprising the steps of:

applying the polyamide acid solution on the soft magnetic metal strip;

performing a first heat treatment for drying the soft magnetic metal strip to obtain the degree of imidization of the polyamide acid solution which is in the range of 15 to 70% after the step of performing the first heat treatment, laminating a plurality of soft magnetic metal strips to each other with the polyamide acid solution; and after the step of laminating the plurality of soft magnetic strips, performing a second heat treatment for heating the laminated soft magnetic metal strips to obtain the degree of imidization of the polyamide acid solution which is more than 90%.

2. The process for production of a soft magnetic metal strip laminate according to claim 1, wherein the second heat treatment is performed while the soft magnetic metal strips are hot pressed to each other.

3. The process for production of a soft magnetic metal strip laminate according to claim 1, wherein the second heat treatment is performed under nitrogen atmosphere, the amount of nitrogen is 98 vol % or more, and a dew point is −30° C. or less.

4. The process for production of a soft magnetic metal strip laminate according to claim 1, wherein the second heat treatment is performed at a temperature that is more than a glass transition temperature of the polyimide resin.

5. The process for production of a soft magnetic metal strip laminate according to claim 1, wherein the degree of imidization of the polyamide acid solution by the first heat treatment is in the range of 25% to 50%.

6. The process for production of a soft magnetic metal strip laminate according to claim 2, wherein a third heat treatment for annealing the soft magnetic metal strip laminate at a temperature that is higher than a temperature of the second heat treatment is performed after the second heat treatment is performed.

* * * * *